United States Patent Office 2,999,048
Patented Sept. 5, 1961

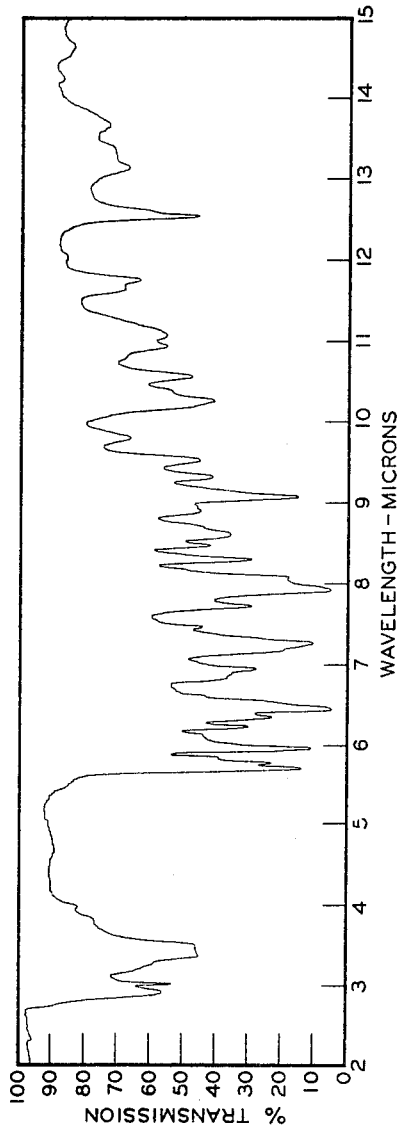

2,999,048
NANCIMYCIN, DIHYDRONANCIMYCIN, THEIR SALTS, AND METHOD OF MANUFACTURE
Richard Donovick, Westfield, Joseph F. Pagano, Bound Brook, and John Vandeputte, Milltown, N.J., assignors to Olin Mathieson Chemical Corporation, New York, N.Y., a corporation of Virginia
Filed Dec. 18, 1957, Ser. No. 703,686
6 Claims. (Cl. 167—65)

This invention relates to new and useful antibiotics, and to methods for their production. More particularly, it relates to new antibiotics in various forms, and to processes for producing one of them by fermentation and the other by hydrogenation, as well as concentrating, purifying and isolating them, and producing their salts. In its free form, one of the two new antibiotics of this invention, which has been produced by fermentation, is called nancimycin; and the other new antibiotic, formed by hydrogenating nancimycin, is called dihydronancimycin.

Nancimycin is formed by the cultivation, under controlled conditions, of Streptomyces albovinaceus.

THE MICROORGANISM

The microorganism useful for the preparation of nancimycin is a newly discovered strain of Streptomyces albovinaceus isolated from a soil sample obtained at Laurel Gap, North Carolina. A culture of the living organism has been deposited and made a part of the stock culture collection of the American Type Culture Collection, Washington, D.C., from whence it is available; and it has been assigned the number 12951 in said collection. The microorganism is hereinafter designated as Streptomyces albovinaceus ATCC 12951.

It is to be understood that the invention is not limited to the use of the particular organism described herein, but includes, inter alia, mutants produced from the described organism by mutating agents, such as X-rays, ultraviolet radiation and nitrogen mustards.

For isolating and characterizing the microorganism, a portion of soil sample is shaken in sterile distilled water and plated on $B_{12}$ screen agar. The medium contains:

| | |
|---|---|
| Agar | 15 G. |
| Sucrose | 10 G. |
| Citric acid | 1.2 G. |
| $(NH_4)_2HPO_4$ | 0.4 G. |
| KCl | 0.08 G. |
| $MgCl_2 \cdot 6H_2O$ | 0.418 G. |
| $MnCl_2 \cdot 4H_2O$ | 0.036 G. |
| $FeCl_3 \cdot 6H_2O$ | 0.023 G. |
| $ZnCl_2$ | 0.021 G. |
| $CoCl_2 \cdot 6H_2O$ | 0.004 G. |
| Distilled water to 1000 cc. | |

The medium is adjusted to pH 7.0 and sterilized in an autoclave at 121° C. for 30 minutes. After 7 to 10 days incubation at 25° C. colonies of Streptomyces albovinaceus ATCC 12951 are isolated from the plated soil. These isolated colonies are then grown on an agar medium which contains:

| | |
|---|---|
| Glucose | 10 G. |
| Bacto tryptone | 5 G. |
| Yeast extract | 3 G. |
| Malt extract | 3 G. |
| Distilled water to 1 liter. | |

The agar is autoclaved at 121° C. for fifteen minutes.

Streptomyces albovinaceus ATCC 12951 when tested by the streak plate procedure on yeast beef agar for antibiotic activity against a variety of bacteria inhibits the gram positive organisms Micrococcus pyogenes var. aureus and Aerobacillus polymyxa and to a lesser extent the gram negative organism Shigella dysenteriae.

The organism is capable of utilizing the following carbon sources in a basal medium containing $(NH_4)_2SO_4$ as a source of nitrogen: rhamnose, xylose, glucose, galactos, fructose, mannose, lactose, maltose, sucrose, dextrin, raffinose, starch, glycerol, inositol, mannitol and sodium acetate. The following carbon compounds support growth poorly: inulin, salicin, sorbitol and sodium citrate. Growth is not supported by arabinose, dulcitol, ammonium formate, ammonium oxalate and ammonium tartrate.

In a basal medium containing starch as a source of carbon the following nitrogen source will support growth: ammonium sulfate. The following nitrogen sources support growth poorly: sodium nitrate, asparagine, 1-tyrosine and d,l-tryptophane. Growth is not supported by sodium nitrite and acetamide.

The organism reduces nitrate to nitrite, does not produce indole, liquifies gelatine and produces no change in litmus milk.

The following is a description of colonies of the microorganism incubated on various media:

On Czapex-Dox Agar, growth is good, colonies have entire edges, spores are white to salmon buss at the edges, reverse growth is apricot buff. No exopigment is produced.

On Nutrient Agar, growth is slight, colonies have entire edges, spores are white, reverse growth is pale olive buff. No exopigment produced.

On Sabouraud Agar, growth is good, colonies have entire edges, spores are pale ecru drab to cinnamon drab, reverse growth is cinnamon. A brown exopigment is produced.

On Soy Bean Infusion Agar, growth is slight, colonies have entire edges, spores are white to smoke gray, reverse growth is pale smoke gray. No exopigment is produced.

On Henrici Agar, growth is good, colonies have entire edges, spores are white over flesh ochre growth, reverse growth is apricot buff. No exopigment is produced.

On Yeast Beef Agar growth is slight, colonies have entire edges, spores are light gull gray, reverse growth is pale olive buff. No exopigment is produced.

THE ANTIBIOTICS

Streptomyces albovinaceus ATCC 12951 produces a mixture of antibiotics. The mixture itself as well as some of the specific antibiotics isolated from the mixture possess broad activity against gram positive bacteria and Mycobacterium tuberculosis and limited activity against gram negative bacteria.

In order to form the antibiotics, including antibiotic nancimycin, Streptomyces albovinaceus ATCC 12951 is grown at a suitable temperature of from about 23° C. to about 30° C., preferably about 25° C., under submerged aerobic conditions in an aqueous nutrient medium containing an assimilable fermentable carbohydrate source and an assimilable nitrogen source. Suitable carbohydrate sources, as indicated above, include: starch; dextrin; sugars, such as maltose, lactose, and glucose; glycerol;

etc. Suitable nitrogen sources include soybean meal, asparagine, caesin hydrolysate, beef extract, yeast extract, etc. The fermentation is carried out for about 24 to about 150 hours. At the end of this period of time, a mixture of antibiotics, including nancimycin, have been formed (as shown by bioassays), as more fully disclosed in the examples.

After growth has been completed, the antibiotics formed can be separated from the culture by a variety of procedures. The preferred method, however, involves acidification of the whole broth to a pH preferably in the range of about 1.6 to about 4.0 by treatment with an acid, such as a mineral acid (e.g. hydrochloric and sulfuric acid), filtering or centrifuging to remove the filtrate, extracting the acidified broth filtrate with a water immiscible solvent, such as butanol, benzene or chloroform, and concentrated the resulting organic phase to a crude mixture of the antibiotics, including nancimycin. Alternatively, the solvent extracts can be concentrated into water, the water concentrates frozen and lyophilized to give a crude mixture of the antibiotics.

Paper chromatograms run on the crude concentrate indicate that at least four materials are present. One of these components is nancimycin, an acidic material. Nancimycin is separated from the other materials by extraction of the crude concentrate with an aqueous water-miscible organic solvent mixture (e.g. aqueous acetone) at an alkaline pH (e.g. a pH of about 8 to about 9.5 and optimally about 8.5). Crystalline nancimycin is obtained by acidifying the resultant extract to a pH of about 2.5 to about 3.5, preferably about 2.8 to about 3. The nancimycin obtained can be further purified by dissolving it in hot alcohol (e.g. absolute ethanol) or other organic solvent wherein nancimycin is soluble (e.g. benzene), filtering off the insolubles and allowing the filtrate to cool, whereupon nancimycin, as a yellow crystalline precipitate, is obtained.

Nancimycin is an organic acid which easily forms salts with bases. Thus by treating nancimycin with an inorganic base, such as an alkali metal base (e.g. sodium hydroxide and potassium hydroxide) or an alkaline earth metal base, the corresponding metal salt is formed. By reacting nancimycin with ammonium hydroxide or an organic base, the corresponding ammonium and amine salts are formed.

Chromatographing the insoluble material remaining after extraction of the crude concentrate with the aqueous water-miscible organic solvent mixture (e.g. aqueous acetone) through acid-washed alumina yields crude crystals of at least two other fractions.

Hydrogenation of nancimycin with hydrogen at atmospheric pressure in a methanol solvent using palladium on charcoal as the catalyst gives a new substance, designated hereinafter as dihydronancimycin which differs from nancimycin in that it contains one extract mole of hydrogen. This substance possesses the same antibacterial spectrum as nancimycin but has only about one-fourth the activity.

The following examples illustrate suitable methods for preparing, purifying and fractionating nancimycin and dihydronancimycin:

*Example 1.—Shake flask fermentation of* Streptomyces albovinaceus *ATCC 12951*

INOCULUM PREPARATION

Yeast beef or soybean infusion agar slants are seeded with *Streptomyces albovinaceus* ATCC 12951. The are incubated for 7 to 10 days and then used to inoculate 100 ml. of aqueous soybean meal medium contained in 500 ml. Erlenmeyer flasks. The composition of the germination medium is:

| | Percent |
|---|---|
| Soybean meal (Staley's nutrient) | 1.5 |
| Glucose | 2.0 |
| NaCl | 0.1 |
| $CaCO_3$ | 0.5 |
| $CoCl_2$ | 0.0005 |

The medium is adjusted to pH 6.8–7.2 prior to sterilization for 20 minutes at 121° C. and at 15 lbs. steam pressures. The germination flasks are incubated at 25° C. for 72 hours on a reciprocating shaker having a 2 inch throw and making 120 strokes/minute.

FERMENTATION CONDITIONS

A 10% transfer is made from the germination flask to 500 ml. Erlenmeyer fermentation flasks containing 100 ml. of the same medium indicated above. The fermentation flasks are incubated and agitated as are the germination flasks. Samples are taken at 3 and 7 days. They are prepared by filtering off the mycelium through a Buchner filter and the untreated broth is bioassayed by the tube dilution method. The results are as follows:

| | Biological Activity in Dilution Units | |
|---|---|---|
| | 3 Days | 7 Days |
| *M. pyrogenes* var. *aureus* | <25 | 750 |
| BCG | 100 | 3,850 |

*Example 2.—Tank fermentation of* Streptomyces albovinaceous *ATCC 12951*

An 800-gallon batch of *Streptomyces albovinaceus* ATCC 12951 is fermented with the media and operating conditions tabulated below:

INOCULUM PREPARATION (A) *First stage.—*

Inoculum source: Culture of *Streptomyces albovinaceus* ATCC 12951 preserved by lyophilization in soil.

Medium:

| | Percent |
|---|---|
| Soybean meal (Staley's nutrient) | 3 |
| Glucose | 2 |
| $CoCl_2 \cdot 6H_2O$ | 0.0005 |
| $CaCO_3$ | 0.1 |

The medium is adjusted to pH 7.0–7.2 prior to sterilization for 30 minutes at 121° C. 100 ml. of the medium in a 500 ml. flask is incubated for 72 hours at 25° C. on a reciprocating shaker having a 2 inch throw and making 120 strokes/minute.

(B) *Second stage.—*

Inoculum source: 10% from first stage.

Medium: Same as first stage.

The medium is adjusted to pH 7.0–7.2 prior to sterilization for 60 minutes at 121° C. 1000 ml. of medium and inoculum in a 4,000 ml. flask is incubated for 48 hours at 25° C. on the reciprocating shaker used in the first stage.

(C) *Third stage.—*

Inoculum source: 1000 ml. from second stage.

Medium:

| | Percent |
|---|---|
| Soybean Meal (Staley's nutrient) | 3 |
| Glucose | 2 |
| $CoCl_2 \cdot 6H_2O$ | 0.0005 |
| $CaCO_3$ | 0.25 |
| NaCl | 0.1 |

The medium is adjusted to pH 7.0–7.2 prior to sterilization for 15 minutes at 121° C. 50 gallons of the medium containing the inoculum is incubated for 40 to 50 hours after the addition of prime burning oil (about 0.5% of batch) as a defoamer. During incubation the broth is aerated at the rate of 2.0 ft./min. superficial air velocity and agitated.

FERMENTATION CONDITIONS

Inoculum source: 50 gallons from third inoculum stage.

Medium: Same as third inoculum stage.

The medium is adjusted to pH 6.8 prior to sterilization for 15 minutes at 121° C. 800 gallons of the medium containing the inoculum is incubated for 75 to 100 hours after the addition of prime burning oil (about 0.5% of batch) as a defoamer. During incubation the batch is aerated and agitated as in the third inoculum stage.

The results of the fermentation are given in the following table with respect to two batches of untreated broth:

| Batch | 1 | | | 2 | | |
|---|---|---|---|---|---|---|
| Fermentation Age, Hours | vs. M. flavus (du./ml.) | vs. S. aureus (du./ml.) | pH | vs. M. flavus (du./ml.) | vs. S. aureus (du./ml.) | pH |
| 0 | | | 6.8 | | | 6.8 |
| 28 | | 1,280 | 7.2 | | 120 | 7.4 |
| 52 | 358 | 2,000 | 7.2 | 1,268 | 2,560 | 6.8 |
| 76 | 360 | 4,000 | 6.9 | 720 | 1,920 | 6.8 |
| 100 | | | | 444 | 3,840 | 6.8 |

Example 3.—Butanol extraction of acid filtered broth 28 liters of the whole broth obtained in Example 2, is acidified to a constant pH of 2 with sulfuric acid and filtered to give 24 liters of acid filtered broth having a pH of 2. The filtered broth is then extracted with 2 x ¼ volumes of butanol. The separated butanol extracts are combined and the butanol azeotropically removed under vacuum. The resulting water concentrate is then neutralized by treatment with 20% sodium hydroxide solution, frozen and lyophilized. A concentrate containing nancimycin (about 21.9 g.) is obtained which assays 40,000 du./mg. against M. pyogenes var. aureus.

Example 4.—Benzene extraction of acid filtered broth 24.2 liters of the acid filtered broth, prepared as described in Example 2, at a pH of 2 is extracted twice with 6 liters of benzene. The combined extracts are concentrated to 300 ml., frozen and lyophilized. The dried concentrate, containing nancimycin, weighs about 3.06 g. and assays 160,000 du./mg. against M. pyogenes var. aureus.

Example 5.—Chloroform extraction of acid filtered broth

An 800 gallon volume of the acid filtered broth, prepared as described in Example 3, at pH 2 is extracted with two 35 gallon volumes of chloroform. The chloroform extracts are combined and concentrated to 5 liters. A precipitate forms which upon drying weighs about 37.5 g. and assays 225,000 du./mg. against M. pyogenes var. aureus.

Addition of 15 liters of hexane to the mother liquor from which the first crop of product was isolated yields a second crop of solids which after drying weigh about 84.2 g. and assay 2,000,000 du./mg. against M. pyogenes var. aureus. Concentration of the second crop mother liquor to an oily residue yields about 100.8 g. of a material which assays 256,000 du./mg.

Example 6.—Extraction of broth filter cake

A filter cake from 24 liters of whole broth which has been acid filtered is found to contain activity and hence is extracted with benzene. The benzene extract is concentrated to 200 ml., frozen and lyophilized. The dried concentrate weighs about 3.6 g. and assays 221,000 du./mg. against M. pyogenes var. aureus.

Example 7.—Crystallization of nancimycin 37.5 of the precipitate formed upon drying the chloroform extract of Example 5, assaying at 225,000 du./mg., is slurried in 1125 ml. of 70% aqueous acetone. The pH of the slurry is raised to 8.5 by use of 5 N sodium hydroxide and the mixture is stirred at that pH for 10 minutes to effect solution and the insolubles then filtered off. The pH of the filtrate is lowered to 2.8 with 5 N sulfuric acid. A crystalline yellow precipitate forms which is filtered off after stirring for one-half hour at pH 2.8. The crystals are washed with a small amount of acetone and vacuum dried. The product weighs about 30.2 g. and assays 251,000 du./mg. against M. pyrogenes var. aureus.

Example 8.—Nancimycin

A 1 g. sample of the crystalline product from Example 7 is dissolved in 30 ml. of hot absolute ethanol (78° C.). The mixture is filtered and the filtrate allowed to cool to room temperature. The crystalline product is filtered off, washed with a little ethanol and dried. The yield is about 600 mg. of nancimycin.

The crystalline product obtained in Example 7 can be similarly recrystallized from hot benzene.

Example 9.—Preparation of salts of nancimycin

Nancimycin readily forms salts with bases. These salts can be made by the general procedure outlined as follows: Nancimycin is suspended in an amount of methanol such that the concentration of the antibiotic is about 12,000 du./ml. One equivalent of 1 N methanolic sodium hydroxide is added and the mixture is stirred for 15 minutes to assure complete solution of the antibiotic. The solution is filtered and 10 volumes of ethyl ether are added to the filtrate. A precipitate of the sodium salt is formed thereby, which is filtered off, washed with ether, and dried in a desiccator.

Example 10.—Dihydronancimycin 1.0 g. of palladium on charcoal is suspended in 140 ml. of methanol. The mixture is maintained under a slight positive pressure of hydrogen for a period of one hour. Two g. of crystalline nancimycin is then added and the whole mixture placed under an atmosphere of hydrogen slightly above atmospheric pressure, agitated, and the hydrogen uptake measured. A total of one mole of hydrogen (96 cc.) is taken up after three hours contact. No more hydrogen is taken up after two hours additional contact. The mixture is then filtered, the palladium on charcoal cake rinsed with methanol and the methanol solution evaporated to dryness under vacuum to yield dihydronancimycin.

Following the procedure of Example 9, dihydronancimycin can be converted to its salt derivatives.

CHEMICAL AND PHYSICAL PROPERTIES OF NANCIMYCIN

Crystalline nancimycin has the following physical and chemical properties:

Color: Yellow.

Melting point: 170–173° C.

Elementary analysis:

C=59.53%
H=6.31%
O=34.16% (by difference)
No other elements present
No acetyl group
Methoxyl=6.72%
Empirical formula—$C_{23}H_{30}O_{10}$ Specific optical rotation:

$$[\alpha]_D^{25°} = -11.7 \ (C=0.5\%) \text{ in methanol}$$

Solubility: Quite soluble in methanol, ethanol, isopropyl alcohol, propyl alcohol, butanol, chloroform, ethyl acetate, amyl acetate, benzene, dimethyl sulfoxide, and dimethyl formamide.

Fair solubility in ether and acetone.

Low solubility in water and hexane.

Ultraviolet spectrum: The ultraviolet absorption maxima of crystalline nancimycin in methanol are:

| λ max. (mµ) | $E_{1cm}^{1\%}$ |
|---|---|
| 225 | 665 |
| 305 | 305 |
| 425 | 230 |

Infrared spectrum: The infrared absorption spectrum of nancimycin suspended in Nujol mull is reproduced in the drawing. Nancimycin shows peaks (and shoulder indicated as "sh") at the following frequencies and wave length:

| Wavelength (µ): | Wavelength (µ): |
|---|---|
| 2.82 | 7.98 |
| 2.94 | 8.25 |
| 3.10 | 8.62 |
| 3.47 | 8.94 |
| 3.85 | 9.08 |
| 4.01 | 9.32 |
| 5.76 | 9.51 |
| 6.00 | 9.76 |
| 6.24 | 10.21 |
| 6.48 | 10.53 |
| 6.84 | 10.94 |
| 6.93 sh | 11.05 |
| 7.22 | 11.75 |
| 7.42 | 12.50 |
| 7.67 | 12.85 |
| 7.86 | 13.06 |
|  | 13.63 |

Neutral equivalent: 459 titrated as an acid
pH stability in 50% aqueous methanol at 30° C.:

Neutral pH—stable for at least five days.
pH 2—stable for at least 24 hours.
pH 9.5—loses activity rather rapidly.
Solid nancimycin is stable at 60° C. for at least five days.

Chemical tests:
(1) An acid which reacts with organic and inorganic bases to form salts.
(2) Is reduced when treated with hydrogen to yield dihydronancimycin.

CHEMICAL AND PHYSICAL PROPERTIES OF DIHYDRONANCIMYCIN

Crystalline dihydronancimycin has the following physical and chemical properties:

Color: Light yellow.
Melting point: 151–153° C.
Elementary analysis:

C=59.47%
H=6.38%
O=34.15% (by difference)
No other elements present.
No acetyl group.
Methoxyl=6.65.
Empirical formula—$C_{23}H_{32}O_{10}$.

Specific optical rotation:

$[\alpha]_D^{25°} = -10.9°$ (C=0.5%) in methanol

Solubility: Very soluble in methanol, ethanol, isopropyl alcohol, propyl alcohol, butanol, amyl alcohol, chloroform, ethyl acetate, amyl acetate, benzene, dimethyl sulfoxide and dimethyl formamide.
Soluble in ether and acetone.
Slightly soluble in water.
Insoluble in hexane.

Ultraviolet spectrum: The ultraviolet absorption maxima of crystalline dihydronancimycin in methanol are:

| λ max. (mµ) | $E_{1cm}^{1\%}$ |
|---|---|
| 222 | 366 |
| 237 | 336 |
| 303 | 262 |
| 340 (sh) | 70 |
| 425 | 148 |

Neutral equivalent: 460 titrated as an acid.
pH stability in 50% aqueous methanol at 30° C.:

Neutral pH—stable for at least a week.
pH 2—stable for at least 24 hours.
pH 9.5—loses activity rather rapidly.
Chemical test: An acid which reacts with organic and inorganic bases to form salts.

BIOLOGICAL PROPERTIES OF NANCIMYCIN AND DIHYDRONANCIMYCIN

The antimicrobial spectra of nancimycin and dihydronancimycin are given in the following table. Both preparations were solubilized in 20% methanol and assayed by the tube-dilution method.

| Microorganism | Nancimycin | Dihydronancimycin |
|---|---|---|
|  | (M.I.C. in γ/ml.) | |
| M. pyrogenes var. aureus | 0.004 | .033 |
| S. pyogenes C203 | 0.006 | .08 |
| M. tuberculosis var. bovis BCG | 0.15 | .066 |
| B. subtilis | 0.15 |  |
| C. septicum | 0.01 |  |
| L. acidophilus | 0.8 |  |
| B. abortus | 2.0 |  |
| S. schottmuelleri | >60 |  |
| E. coli | >60 |  |
| P. vulgaris | >60 |  |
| K. pneumoniae | >60 | >50 |
| A. aerogenes | >60 |  |
| P. aeruginosa | >60 |  |
| S. faecalis | >60 |  |
| S. dysenteriae | >60 |  |
| S. sonnei | >60 |  |
| S. typhosa | >60 | >50 |

The biological activity of crystalline nancimycin, having a potency in vitro of 480,000–960,000 dilution units per mg. vs. *Micrococcus pyogenes* var. *aureus* 209P and 300,000 dilution units per mg. vs. *Streptococcus pyogenes* C203 is as follows:

(A) *Toxicity.*—
(1) Eggs: Groups of eight 7-day old embryonated eggs each are inoculated by the yolk sac route with a solution of nancimycin in 10% methyl alcohol. The maximal tolerated dose was greater than 5 mg./egg.
(2) Mice (subacute toxicity): Groups of ten mice (Harpaul strain, 18–20 g.) each were inoculated by the oral and subcutaneous routes with a single daily dose of nancimycin for five days. The maximal tolerated dose was greater than 1,000 mg./kg. by either route.

(B) *In vivo activity.*—
(1) vs. *Rickettsia rickettsii*: Groups of eight 7-day old embryonated eggs each infected by the yolk sac route with 100 $LD_{50}$'s of *R. rickettsii* were treated by the same route ½ hour after infection. A single dose of nancimycin of 1.6 mg./egg gave a 50% protection ($PD_{50}$).
(2) vs. Meningopneumonitis virus:
(a) Eggs—Groups of eight 7-day old embryonated eggs each infected with 100 $LD_{50}$'s of meningopneumonitis virus were treated by the same yolk sac route ½ hour after infection with nancimycin. The $PD_{50}$ was about 0.5 mg./egg.
(b) Mice—Groups of 10 mice (Harpaul strain, 12–14 g.) each infected intranasally with a 1% suspension of mouse lung virus were treated by the oral route one day after infection. A daily dose of 150 mg./kg./day×4 days protected 5 our of 10 mice, with an increase in the average survival time of 3 days over that of the controls. There was a 20% survival in the infection control group.

(3) vs. *Streptococcus pyogenes* C203: Groups of ten mice each infected by the i. p. route with *Streptococcus pyogenes* C203 were treated ½ hour after infection by the oral or subcutaneous route. The results are summarized below:

| Treatment with nancimycin | Route | Percent Survival 5 days post infection |
|---|---|---|
| 250 mg./kg./day×4 days | per os | 20 |
| 250 mg./kg./day×4 days | s.c. | 40 |
| Saline controls | | 0 |

Nancimycin was also found to give a therapeutic effect when given to mice infected with *Mycobacterium tuberculosis* var. *bovis*, Ravenel strain.

Dihydronancimycin has the same biological activity as has nancimycin, but is only about one-fourth as active.

The antibacterial effectiveness of nancimycin and dihydronancimycin in human beings has not as yet been demonstrated.

Nancimycin and dihydronancimycin can be used in hospital laboratories to isolate *Klebsiella pneumoniae* from swabs or body exudates of patients in which mixed populations of certain other organisms, such as *Bacillus subtilis* and *Micrococcus pyogenes* var. *aureus*, are present. The latter organisms are relatively susceptible to nancimycin and dihydronancimycin whereas *K. pneumoniae* is relatively resistant, and when appropriate concentrations of nancimycin and dihydronancimycin are present in the medium, *K. pneumoniae* will grow where *B. subtilis* or *M. pyogenes* var. *aureus* will not.

The invention may be otherwise variously embodied within the scope of the appended claims.

What is claimed is:

1. A substance effective in inhibiting the growth of gram positive bacteria, selected from the group consisting of nancimycin, dihydronancimycin and salts thereof, said nancimycin being an organic acid having the following elementary analysis: C=59.53%, H=6.31%, O=34.16%; empirical formula=$C_{23}H_{30}O_{10}$ that possesses a yellow crystalline structure in the pure state; has a specific optical rotation, as measured by the D line of sodium at 25° C. of −11.7 in butanol at 0.5% concentration; is quite soluble in methanol, ethanol, isopropyl alcohol, propyl alcohol, butanol, chloroform, ethyl acetate, amyl acetate, benzene, dimethyl sulfoxide, and dimethyl formamide; has an ultraviolet absorption spectrum measured in methanol with bands at the following wave lengths: 225, 305, and 425 millimicrons and respective extinction coefficients of 665, 305, and 230; an infrared absorption spectrum when suspended in hydrocarbon oil is solid form, as shown in the drawing; and a neutral equivalent when titrated as an acid of about 459; and said dihydronancimycin being the dihydrogenated derivative of the product with the immediately foregoing characteristics and being dihydrogenated nancimycin, an organic acid having the following elementary analysis: C=59.47, H=6.38%, O=34.15%; empirical formula= $C_{23}H_{32}O_{10}$ that possesses a light yellow crystalline structure in the pure state; has a specific optical rotation, as measured by the D line of sodium at 25° C. of −10.9 in methanol at 0.5% concentration; is soluble in methanol, ethanol, isoproyl alcohol, propyl alcohol, butanol, amyl alcohol, chloroform, ethyl acetate, amyl acetate, benzene, dimethyl sulfoxide and dimethyl formamide; has an ultraviolet absorption spectrum measured in methanol with bands at the following wave lengths: 222, 237, 303, 340 (sh), 425 millimicrons and respective extinction coefficients of 366, 336, 262, 70, and 148; and a neutral equivalent when titrated as an acid of about 460.

2. Nancimycin, as defined in claim 1.

3. An alkali metal salt of nancimycin, as defined in claim 1.

4. Dihydronancimycin, as defined in claim 1.

5. A process for producing nancimycin, which comprises cultivating a strain of *Streptomyces albovinaceus* ATCC 12951 in an aqueous nutrient medium, until substantial antibacterial activity is imparted to said medium, and recovering nancimycin from said medium.

6. A process for producing dihydronancimycin, which comprises hydrogenating nancimycin, as defined in claim 1 and recovering the dihydrogenated nancimycin produced.

References Cited in the file of this patent

UNITED STATES PATENTS 2,649,401     Haines     Aug. 18, 1953

OTHER REFERENCES

Pridham et al.: Applied Microbiology, January 1958, pp. 52–79.

Sneath: J. Gen. Microbiology, August 1957, pp. 184–200, page 185 is especially pertinent.

J. Bacteriology, pages 3 and 4, January 1956.